United States Patent [19]

Morrison

[11] Patent Number: 5,661,230

[45] Date of Patent: Aug. 26, 1997

[54] ASSEMBLY AND METHOD FOR TESTING THE INTEGRITY OF STUFFING TUBES

[75] Inventor: Edward Francis Morrison, Burnt Hills, N.Y.

[73] Assignee: The United States of America as represented by the United States Department of Energy, Washington, D.C.

[21] Appl. No.: 616,143

[22] Filed: Mar. 14, 1996

[51] Int. Cl.⁶ ....................................... G01M 3/02
[52] U.S. Cl. ................................. 73/46; 73/49.8
[58] Field of Search ..................... 73/40.5 R, 46, 73/49.8; 285/13, 46, 45, 417; 137/312

[56] References Cited

U.S. PATENT DOCUMENTS

| | | |
|---|---|---|
| 2,708,123 | 5/1955 | Risley et al. ............................... 285/45 |
| 2,766,614 | 10/1956 | Cook ............................................ 73/46 |
| 2,896,669 | 7/1959 | Broadway et al. ..................... 285/45 X |
| 4,207,918 | 6/1980 | Burns et al. ............................ 285/45 X |
| 4,282,743 | 8/1981 | Pickett ............................................ 73/46 |
| 4,601,194 | 7/1986 | Miller et al. ............................. 73/46 X |
| 5,309,752 | 5/1994 | Beckinghausen, Jr. et al. ......... 73/46 X |

*Primary Examiner*—Michael Brock
*Attorney, Agent, or Firm*—John T. Lucas; William R. Moser; Paul A. Gottlieb

[57] ABSTRACT

A stuffing tube integrity checking assembly includes first and second annular seals, with each seal adapted to be positioned about a stuffing tube penetration component. An annular inflation bladder is provided, the bladder having a slot extending longitudinally therealong and including a separator for sealing the slot. A first valve is in fluid communication with the bladder for introducing pressurized fluid to the space defined by the bladder when mounted about the tube. First and second releasable clamps are provided. Each clamp assembly is positioned about the bladder for securing the bladder to one of the seals for thereby establishing a fluid-tight chamber about the tube.

20 Claims, 2 Drawing Sheets

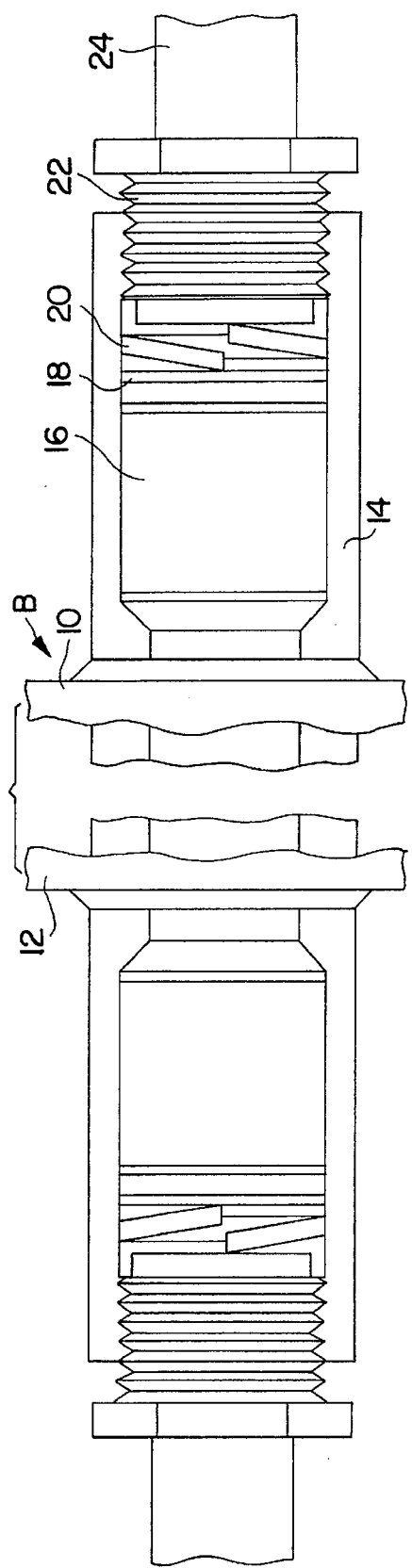
FIG. 1
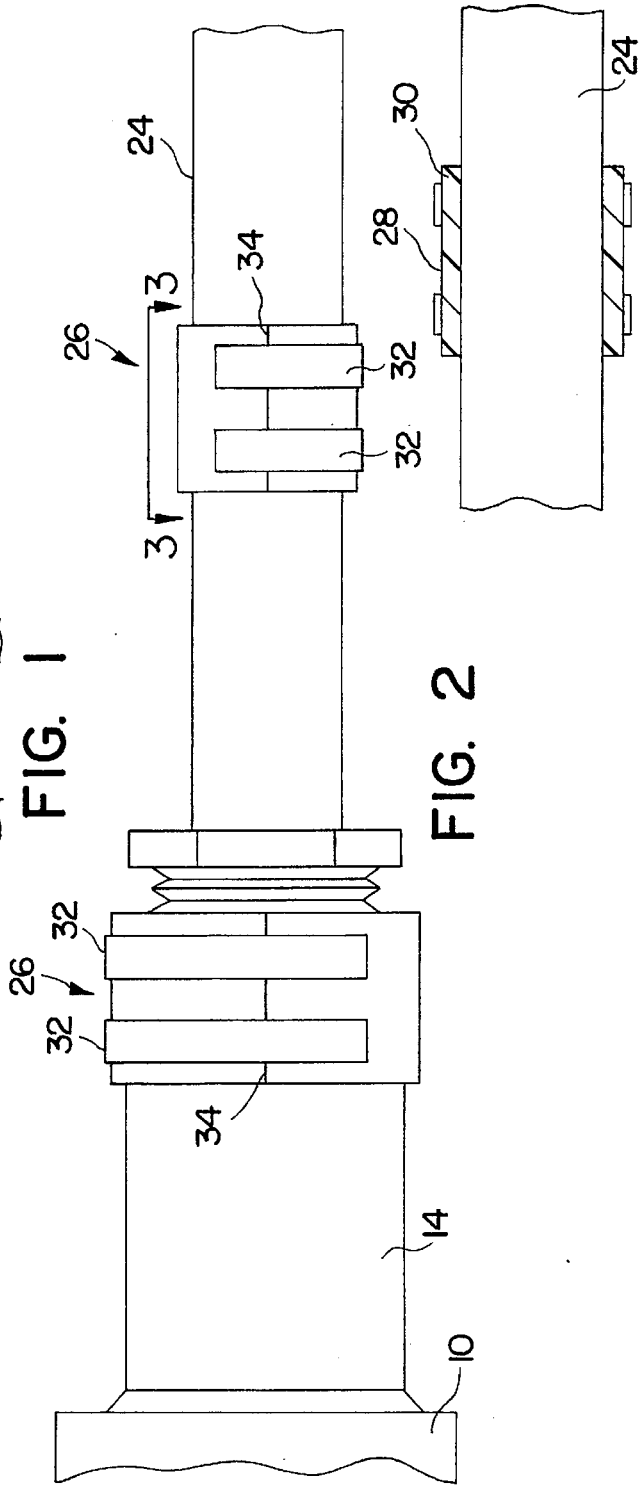
FIG. 2
FIG. 3

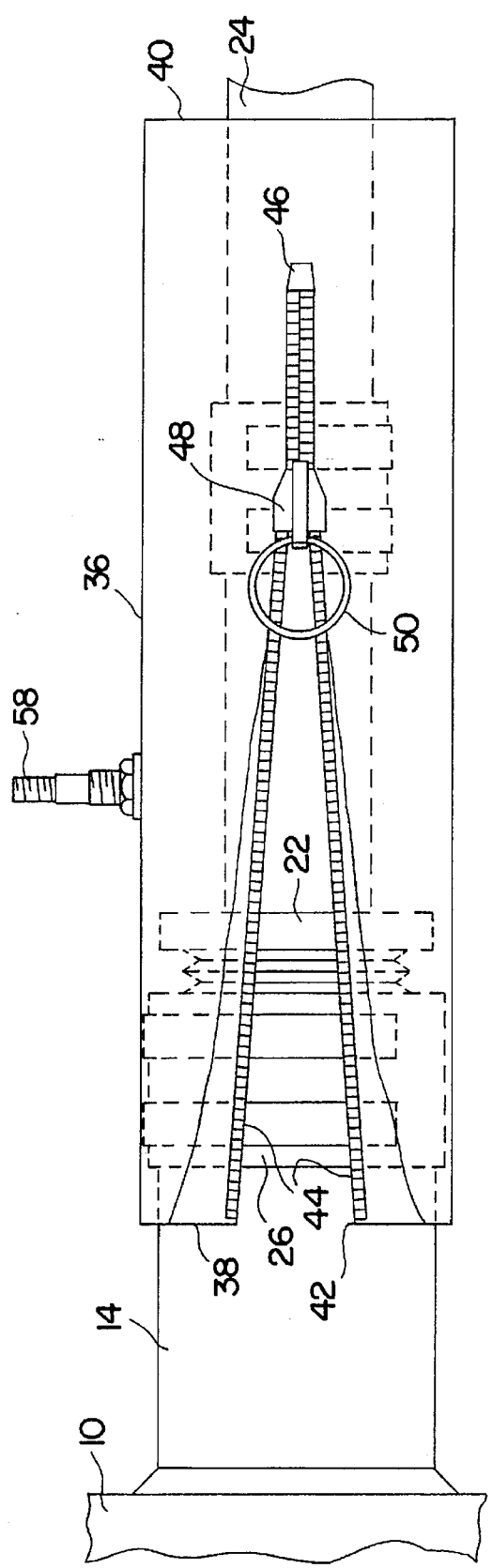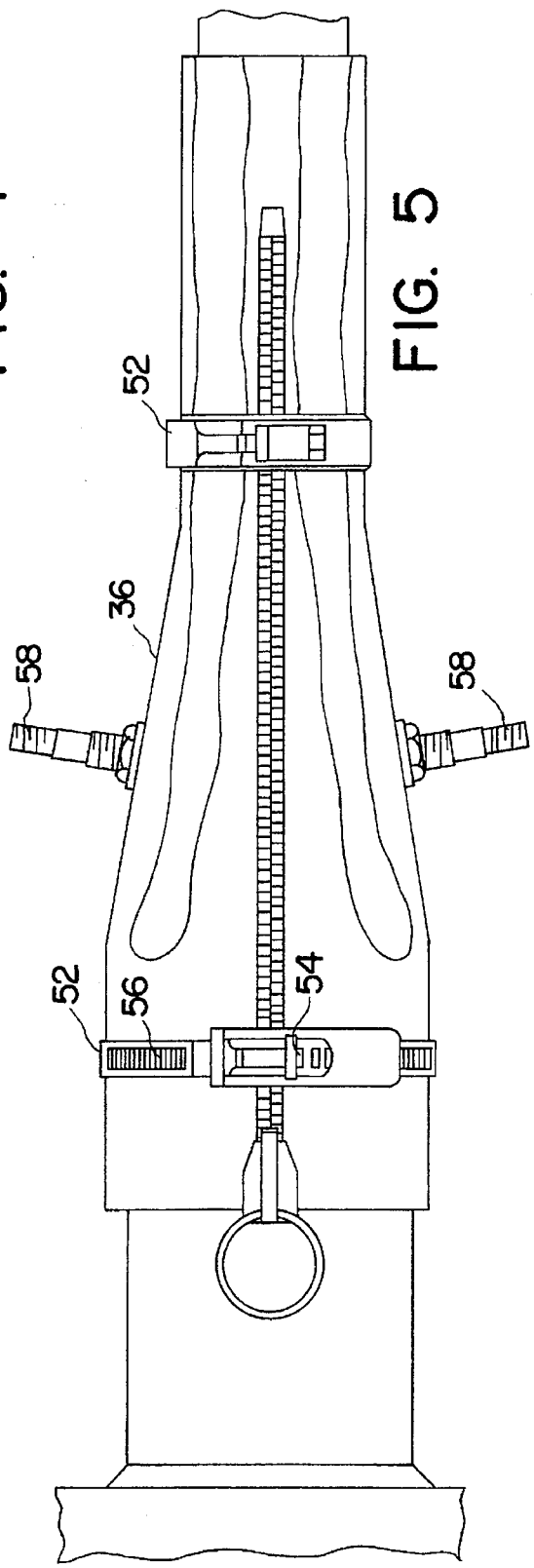

ASSEMBLY AND METHOD FOR TESTING THE INTEGRITY OF STUFFING TUBES

GOVERNMENT SUPPORT

This invention was made with government support under contract number DE-AB01-95GC20394 awarded by the Department of Energy. The government may have certain rights in this invention.

FIELD OF THE INVENTION

The disclosed invention is to an assembly and method for testing for potential leaks at stuffing tubes used for electrical cable penetrations of pressure-tight compartments. More particularly, the invention is the use of a removable, air-tight bladder which may be conveniently positioned about a stuffing tube to apply a pressure thereto to permit testing for leaks.

BACKGROUND OF THE INVENTION

A stuffing tube penetration consists of a metal cylinder having internal pipe threads on each end. This cylinder is welded to an enclosure or bulkhead, from either side of which it protrudes for a predetermined length. A stuffing tube assembly is installed on each end of the cylinder as the wire or cable is fed through. The assembly consists of a silicone or neoprene rubber packing grommet, a gland ring, a bevel washer, and a nut which is tightened onto the pipe threads to apply the necessary torque for finalizing the installation. The nut, gland ring, and bevel washer must be installed from the end of the wire, because they are not split and installation could not be performed once the wire is in place. Testing of the stuffing tube seals to ensure their integrity against leakage is required, both where the tube enters the enclosure and exits it.

The enclosure is a compartment or area that must be able to maintain pressure with a minimal leak rate. Current practices for a new enclosure involve an air pressurization of the entire enclosure, with a soap bubble check then being performed on each individual stuffing tube penetration. If a new wire or cable has been added to an existing enclosure, then an air blast test may be utilized. This involves applying a direct blast of air to one side of the penetration, at the stuffing tube joint, and performing a soap bubble check at the stuffing tube joint on the other side of the enclosure. The air blast method is not a reliable method of testing for integrity, however.

Where testing requires pressurization of the entire enclosure, such as for new installations, then it is both costly and manpower intensive because the pressurization of the entire enclosure is required to verify individual stuffing tube integrity with a sufficiently reliable level of confidence. Because of these costs and disadvantages for new installations, and because the air blast test for existing installations is considered to be unreliable, then there is a need for an improved test mechanism for inspection of the integrity of stuffing tube joints. Various methods have been attempted, but the problem of establishing a seal around a wire which is not accessible from the end is not an easy task. Previous methods of using a rubber bladder with various combinations of metal cylinders, glue, and a variety of clamping techniques have proven cumbersome and time consuming.

Those skilled in the art will recognize there is a need for an improved method for testing the integrity of stuffing tubes which avoids the costs and disadvantages of the prior art.

The disclosed invention provides a reliable method for application of a continuous, regulated source of air pressure to individual stuffing tubes. The invention is a low-cost device which is easy to install, requires a minimum amount of tools, permits several stuffing tubes to be tested at the same time, and utilizes reusable parts. The disclosed invention provides a method of establishing a pressure boundary around joints which are otherwise not accessible from their ends.

SUMMARY OF THE INVENTION

A stuffing tube integrity checking assembly includes first and second annular seals, with each seal adapted to be positioned about a stuffing tube penetration or cable to be tested. An annular inflation bladder is provided, and the bladder has a slot extending longitudinally therealong and also a means for sealing the slot. A first valve is in fluid communication with the bladder for introducing pressurized fluid to the space defined by the bladder when mounted about the tube and cable. First and second releasable clamp assemblies are provided. Each clamp assembly is adapted to be positioned about the bladder for securing the bladder to one of the seals so that a fluid-tight chamber is formed about the tube.

In combination there is provided a stuffing tube penetration extending from a bulkhead and an inflation bladder disposed thereabout. First and second annular seals are secured about the penetration, and disposed therealong and along the cable in spaced orientation. An annular inflation bladder is disposed about the penetration and the cable and overlies each of the seals. The bladder has a longitudinally extending slot which is sealed by a separator. First and second clamp assemblies are disposed about the bladder in alignment with an associated one of the seals, for thereby securing the bladder to the seals and providing a fluid-type chamber about the penetration and cable. A first valve is in fluid communication with the bladder for introducing pressurized fluid to the chamber.

A method for testing the integrity of a stuffing tube includes the steps of positioning in spaced relation first and second seals about a stuffing tube penetration and an associated cable. An inflation bladder is positioned about the tube and cable and is in engagement with the seals. The bladder is clamped to the seals, and thereby forms a fluid-type chamber about the tube and cable. The bladder is then inflated, and pressure applied to the tube.

These and other objects and advantages of the invention will be readily apparent in view of the following description and drawings of the above-described invention.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a fragmentary elevational view partially in section of a stuffing tube penetration extending through a bulkhead;

FIG. 2 is a fragmentary elevational view of a portion of FIG. 1;

FIG. 3 is a fragmentary cross-sectional view taken along the line 3—3 of FIG. 2 and view in the direction of the arrow;

FIG. 4 is a fragmentary elevational view illustrating the inflation bladder of the invention being positioned for use; and FIG. 5 is a view similar to that of FIG. 4 with the bladder in the installed and ready-to-use position.

DETAILED DESCRIPTION OF THE INVENTION

Bulkhead B, as best shown in FIG. 1, has walls 10 and 12 which define an enclosure and through which a stuffing tube penetration 14 extends. Typically the penetration is welded to the walls 10 and 12. A stuffing tube assembly 16 is positioned within stuffing tube penetration 14. A packing grommet 18, which may be silicone or neoprene rubber, bears against one end of stuffing tube assembly 16. Bevel washer 20 rests against grommet 18. Nut 22 is threaded into the correspondingly threaded end of stuffing tube penetration 14 and is adjusted to the required torque for assuring proper installation. Armored cable 24 which may consist of one or more wires, extends through nut 22 and through stuffing tube penetration 14.

Seals 26 are disposed about stuffing tube penetration 14 and cable 24 in spaced longitudinal relation, as best shown in FIG. 2. Each of the seals 26 is appropriately sized for being wrapped about the stuffing tube penetration 14 or the cable 24 to provide a fluid-type seal therewith. Preferably, each of the seals 26 is formed of a closed cell foam neoprene rubber to which a Lycra® backing is applied for durability. Lycra is a fabric formed from elastic segmented polyurethane fibers. I prefer that Lycra backing 28, as best shown in FIG. 3, be positioned over the rubber 30 to permit the seals 26 to be reused. Preferably Velcro® strips 32 are wrapped about each of the seals 26, to secure the seals 26 in position and to maintain them there. Each of the seals 26 is bifurcated, providing a joint 34 which is closed when the seals 26 are properly positioned with the Velcro strips 32 in place.

Inflation bladder 36, as best shown in FIG. 4, has a first end 38 adjacent wall 10 and a remote end 40 disposed beyond the outer one of the seals 26. In this way, the inflation bladder 36 extends beyond and overlies the seals 26. Inflation bladder 36 preferably is formed from a nylon reinforced neoprene rubber material, and therefore is airtight and fluid-tight. Bladder 36 has a slot 42 which starts at end 38 and which terminates short of end 40. The slot 42 extends longitudinally along the bladder 36 to permit same to be relatively easily placed about stuffing tube penetration 14 and cable 24.

Gripping teeth 44 extend along the juxtaposed edges of slot 42. Retainer 46 closes the slot 42 at end 40. A slider 48 has a ring 50 by which the slider 48 may be pulled for bringing the teeth 44 into and out of engagement for thereby closing the slot 42. The teeth 44, retainer 46, and slider 48 thus resemble a zipper, and may be thought of as a separator similar to a zipper found on a jacket. The teeth 44 when brought into engagement by slider 48 provide a fluid-type joint so that the stuffing tube penetration 14 and cable 24 are thus surrounded by a bladder 36.

Lined clamps 52 are disposed about bladder 36 and overlie the seals 26. Each of the clamps 52 has a worm drive 54 engageable with serrations 56 for causing the particular clamp to be secured about or released from engagement with bladder 36. Because the clamps 52 are lined, then the fabric outer covering of the bladder 36 is precluded from being lodged in the serrations 56 of the clamps 52 during installation and removal of the clamps 52 and the bladder 36. The clamps 52 may be suitably tightened about the bladder 36 for assuring a fluid-type connection between the bladder 36 and the seals 26. In this way, an annular chamber is formed about the cable 24.

Tubeless clamp-in valves 58, only one of which is shown in FIG. 4, communicate with bladder 36 for permitting a pressurized fluid, such as compressed air, to be introduced into the annular chamber disposed between penetration 14, cable 24, and bladder 36. I prefer that there be two valves 58, with one of the valves 58 being used for application of pressurized fluid and the other valve 58 being used for monitoring the pressure, such as through use of a pressure gauge. Because the inflation bladder 36 is fluid-tight and has a fluid-tight connection to the seals 26, then application of pressurized fluid to the annular chamber defined by the bladder 36 about the cable 24 permits leaks at the stuffing tube joints to be checked by a soap bubble test.

Operation of the invention is relatively easy. A seal 26, which has been sized to fit the stuffing tube penetration is placed over the penetration, near its end, and secured with the Velcro fasteners 32. A second seal is then wrapped firmly around the cable 24, preferably positioned about three inches from the end of the penetration 14, and is likewise secured with its Velcro fasteners 32.

Inflation bladder 36 is then positioned around the penetration 14 and the cable 24, so that the valves 58 are positioned approximately midway between the two installed seals 26. Slider 48 is then engaged and drawn its full length for bringing the teeth 44 into engagement.

Thereafter, clamps 52 are positioned on the bladder 36, one clamp at each seal 26 location, preferably between the spaced Velcro fasteners 32. The inflation bladder 36 is then inflated to the desired pressure, and a soap bubble check may be performed at the opposite end of the penetration 14 at potential leakage locations. Sealings of up to 18 psi, on a 3½ diameter stuffing tube penetration 14, have been satisfactorily demonstrated. Upon completion of the testing, the clamps 52 and the inflation bladder 36 are removed and saved for future use. The seals 26 may be inspected and discarded if damaged.

While this invention has been described as having a preferred embodiment, it is to be understood that it is capable of further modification, uses, and/or adaptations which follow in general the principle of the invention and include such departures from the present disclosure as come within known or customary practice in the art to which the invention pertains, and as may be applied to the central feature hereinbefore set forth, and fall within the scope of the limits of the appended claims.

What I claim is:

1. Stuffing tube integrity checking assembly, comprising:
    a) first and second annular seals, each seals adapted to be positioned about one of a stuffing tube penetration and an associated cable;
    b) an annular inflation bladder, said bladder having a slot extending longitudinally therealong and including means for sealing said slot;
    c) a first valve in fluid communication with said bladder for introducing pressurized fluid to the space defined by said bladder when positioned about the stuffing tube penetration and cable; and
    d) first and second releasible clamp assemblies, each clamp assembly adapted to be positioned about said bladder for securing said bladder to one of said seals for thereby establishing a fluid-tight chamber about the stuffing tube penetration and cable.

2. The assembly of claim 1, wherein:
    a) each of said seals includes a polymeric member for sealing engagement with the stuffing tube penetration or the associated cable.

3. The assembly of claim 2, wherein:
a) each member has an inner surface for engagement with the stuffing tube penetration or the associated cable and an outer surface, and a backing is applied to the outer surface for reinforcement.

4. The assembly of claim 3, wherein:
a) each said polymeric member is a closed cell foam neoprene rubber; and
b) said backing is a fabric.

5. The assembly of claim 4, wherein:
a) the fabric is formed from elastic, segmented polyurethane fiber.

6. The assembly of claim 5, wherein:
a) each of said seals includes a releasible fastener for permitting said seals to be releasably secured about the stuffing tube penetration or the associated cable.

7. The assembly of claim 6, wherein:
a) each of said fasteners-includes a Velcro fastener.

8. The assembly of claim 1, wherein:
a) said bladder is formed from a reinforced polymeric material.

9. The assembly of claim 8, wherein:
a) said material is nylon reinforced neoprene rubber.

10. The assembly of claim 8, wherein:
a) said slot extends along a portion of said bladder.

11. The assembly of claim 8, wherein: a) said bladder has spaced first and second ends; and
b) said slot starts at one of said ends and terminates intermediate said ends.

12. The assembly of claim 8, wherein:
a) said means for sealing includes a separator.

13. The assembly of claim 12, wherein:
a) said separator includes a plurality of interengageable teeth and a slider for releasably engaging said teeth.

14. The assembly of claim 1, wherein:
a) each of said clamp assemblies includes a worm drive.

15. The assembly of claim 14, wherein:
a) each of said clamp assemblies includes a lining engageable with said bladder for precluding damage to said bladder.

16. The assembly of claim 1, further comprising:
a) a second valve in fluid communication with said bladder.

17. The assembly of claim 16, wherein:
a) each of said valves includes a tubeless clamp-in valve stem.

18. In combination:
a) a stuffing tube penetration and a cable extending from a bulkhead;
b) first and second annular seals, one of said seals secured about said stuffing tube penetration and the other of said seals secured about said cable;
c) an annular inflation bladder disposed about and overlying said seals, said bladder having a longitudinally extending slot sealed by a separator;
d) first and second clamp assemblies, each of said clamp assemblies disposed about said bladder and in alignment with an associated one of said seals for thereby securing said bladder to said seals and providing a fluid-tight chamber about said stuffing penetration tube and said cable; and
e) a first valve in fluid communication with said bladder for introducing pressurized fluid to said chamber.

19. The combination of claim 18, wherein:
a) said bladder is nylon reinforced neoprene rubber;
b) each of said seals includes a closed cell foam neoprene rubber member; and
c) each of said clamp assemblies includes a worm drive.

20. A method of testing the integrity of a stuffing tube, comprising the steps of:
a) positioning in spaced relation first and second seals about a stuffing tube penetration and an associated cable;
b) positioning an inflation bladder about and in engagement with the seals;
c) clamping the bladder to the seals and thereby forming a fluid-tight chamber; and
d) inflating the bladder.

* * * * *

UNITED STATES PATENT AND TRADEMARK OFFICE
CERTIFICATE OF CORRECTION

PATENT NO. : 5,661,230
DATED : August 26, 1997
INVENTOR(S) : Edward F. Morrison

It is certified that error appears in the above-identified patent and that said Letters Patent is hereby corrected as shown below:

In Column 1, line 7, delete "DE-AB01-95GC20394" and substitute therefor "DE-AC12-76SN00052

Signed and Sealed this

Eighteenth Day of July, 2000

Attest:

Q. TODD DICKINSON

*Attesting Officer*      *Director of Patents and Trademarks*